United States Patent
Bunker et al.

(10) Patent No.: US 6,183,197 B1
(45) Date of Patent: Feb. 6, 2001

(54) AIRFOIL WITH REDUCED HEAT LOAD

(75) Inventors: Ronald Scott Bunker, Niskayuna; Nesim Abuaf, Schenectady, both of NY (US)

(73) Assignee: General Electric Company, Schenectady, NY (US)

(*) Notice: Under 35 U.S.C. 154(b), the term of this patent shall be extended for 0 days.

(21) Appl. No.: 09/253,367

(22) Filed: Feb. 22, 1999

(51) Int. Cl.[7] .................................................. F01D 5/08
(52) U.S. Cl. ........................ 416/95; 416/228; 416/235; 415/178; 415/914
(58) Field of Search .................................... 415/175, 176, 415/177, 178, 115, 914; 416/95, 96 R, 228, 236 R, 235

(56) References Cited

U.S. PATENT DOCUMENTS

| | | | |
|---|---|---|---|
| 4,522,360 | * 6/1985 | Barnwell et al. | 244/204 |
| 4,720,239 | * 1/1988 | Owczarek | 415/181 |
| 4,859,150 | * 8/1989 | Takigawa | 416/223 R |
| 4,872,484 | * 10/1989 | Hickey | 137/561 R |
| 4,974,633 | * 12/1990 | Hickey | 137/561 R |
| 5,337,568 | 8/1994 | Lee et al. | 60/755 |

* cited by examiner

Primary Examiner—F. Daniel Lopez
Assistant Examiner—Ninh Nguyen
(74) Attorney, Agent, or Firm—Patrick K. Patnode; Marvin Snyder

(57) ABSTRACT

An airfoil with a reduced heat load for use in either a turbine or a compressor of a gas turbine engine comprises having at least one heat reducing dimple on the body of the airfoil or on the associated endwall of the airfoil. The body of the airfoil is comprised of a leading edge, a trailing edge, a pressure side and a suction side. The length of the heat reducing dimple in the expected direction of hot gas stream flow is at least equal to or greater than the width transverse to such direction. The heat reducing dimple is located on the airfoil or endwall so as to reduce the heat load as the hot gas stream flow passes from the leading edge to the trailing edge.

20 Claims, 8 Drawing Sheets

AIRFOIL WITH REDUCED HEAT LOAD

BACKGROUND OF THE INVENTION

This invention relates to reducing external heat load n an airfoil, either stationary, rotating, or their associated endwalls through use of heat reducing dimples located on the airfoil or its associated endwall.

Turbine airfoils are subject to extreme heat loads in high performance machines such as aircraft engines and power turbines. The temperature of hot gases entering the turbine can be well above the melting point temperatures of the alloys from which the airfoils are fabricated to such a degree that highly air-cooled airfoils are now common in the industry. Features that have the ability to reduce this heat load can directly benefit the performance of the turbines.

It is known in the industry to cool airfoils by flowing a cooling fluid through the hollow interior of the airfoil. The most common method is to bleed air from the compressor that is at a relatively lower temperature into the interior of the airfoil. Generally, the cooling is accomplished by external film cooling, and internal air impingement and convection cooling, or a combination of both. Air impingement cooling contemplates compressor bleed air channeled to the inside of the airfoil and directed onto the inside wall of the airfoil. The air then exits through a set of film cooling holes on the surface of the airfoil.

Film cooling has been shown to be very effective but requires a great deal of fluid flow that typically requires the use of power and is therefore looked upon as penalizing fuel efficiency and power. Also, film cooling is sometimes actively controlled, which is complex and expensive. Another disadvantage of film cooling is the degree of complexity in fabricating and machining the airfoils. The added complexity of film cooling results in more features that can break down while operating. Thus, film cooling of airfoils greatly increases the cost of operating.

As such, features and techniques that reduce the heat load on the airfoil surface and are relatively simple in nature, not requiring the complexity or power penalties of film cooling, are quite desirable. It was this desire which led to the so-called riblets on the leading edge described in U.S. Pat. No. 5,337,568 issued to Lee et. al. and titled Micro-Grooved Heat Transfer Wall. Riblets are a series of continuous grooves in a surface that are aligned in the direction of the flow, that serve to reduce the surface drag and the heat transfer when formed with the correct height, width, shape and spacing. Such riblets have been demonstrated to reduce drag on the fuselages of aircraft. However, for application to turbine airfoils, riblets are not as straightforward to use due to the extremely small size required for precision machining in the surfaces, and due to the fact that the riblet geometry would need to be altered for each region of the airfoil surface or each operating condition.

Accordingly, there is a need in the art for an airfoil where heat load is reduced passively over the entire airfoil surface and is also easy to fabricate or machine.

SUMMARY OF THE INVENTION

According to the present invention, an airfoil with a reduced heat load for use in either a turbine or a compressor through which a hot gas stream flow passes comprises a body having a leading edge and a trailing edge, the body having an exterior surface shaped from the leading edge to the trailing so as to have a suction area which has a convex shape. The suction area will experience a relatively low gas pressure as the hot gas stream flow passes thereover from the leading edge to the trailing edge. The body will be further shaped so as to have a pressure area from the leading edge to the trailing edge which will be concave in shape. The pressure area will experience a relatively high gas pressure as the hot gas stream flow passes thereover from the leading edge to the trailing edge.

The heat load is reduced on the airfoil by having at least one heat reducing dimple on the body of the airfoil. Each dimple has a length that is preferably aligned with the expected direction of hot gas stream flow. The width of a dimple is accordingly preferably aligned in a direction transverse to the expected direction of hot gas stream flow. To achieve the benefits of this invention, the length must be at least equal to or greater than the width.

The heat reducing dimple reduces the heat transfer coefficient for the airfoil downstream of its location. This serves to reduce the total heat load on the airfoil. Thus, the present invention is advantageous because the heat reducing dimple can be placed anywhere on the airfoil body. Furthermore, heat load can be reduced without the need for the expensive, power consuming film cooling mechanism of the prior art. Since the heat reducing dimples contemplated for use with this invention are relatively large, they are easy to machine into the surface of an airfoil.

The present invention also contemplates a method of reducing heat load on a turbine or compressor airfoil by forming at least one heat reducing dimple in the body of the airfoil. This method can be employed in existing airfoils to further reduce heat load or to save power for film cooled airfoils since less film cooling will be needed to accomplish the same reduction in heat load.

DETAILED DESCRIPTION OF THE INVENTION

Figure 1:
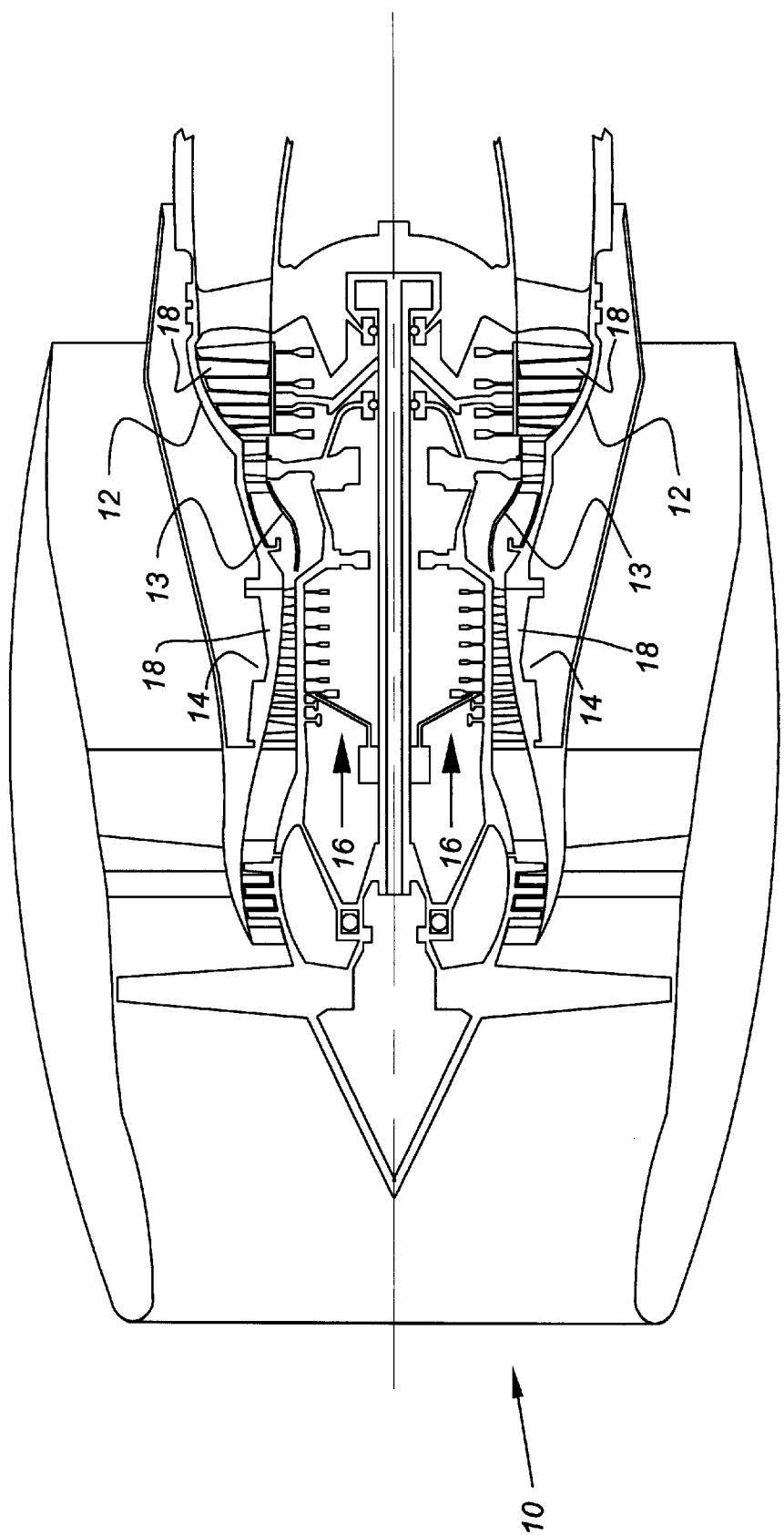
FIG. 1 is a cross-sectional view of a gas turbine engine of the type employing the turbine and compressor airfoils of the present invention.
Figure 2:
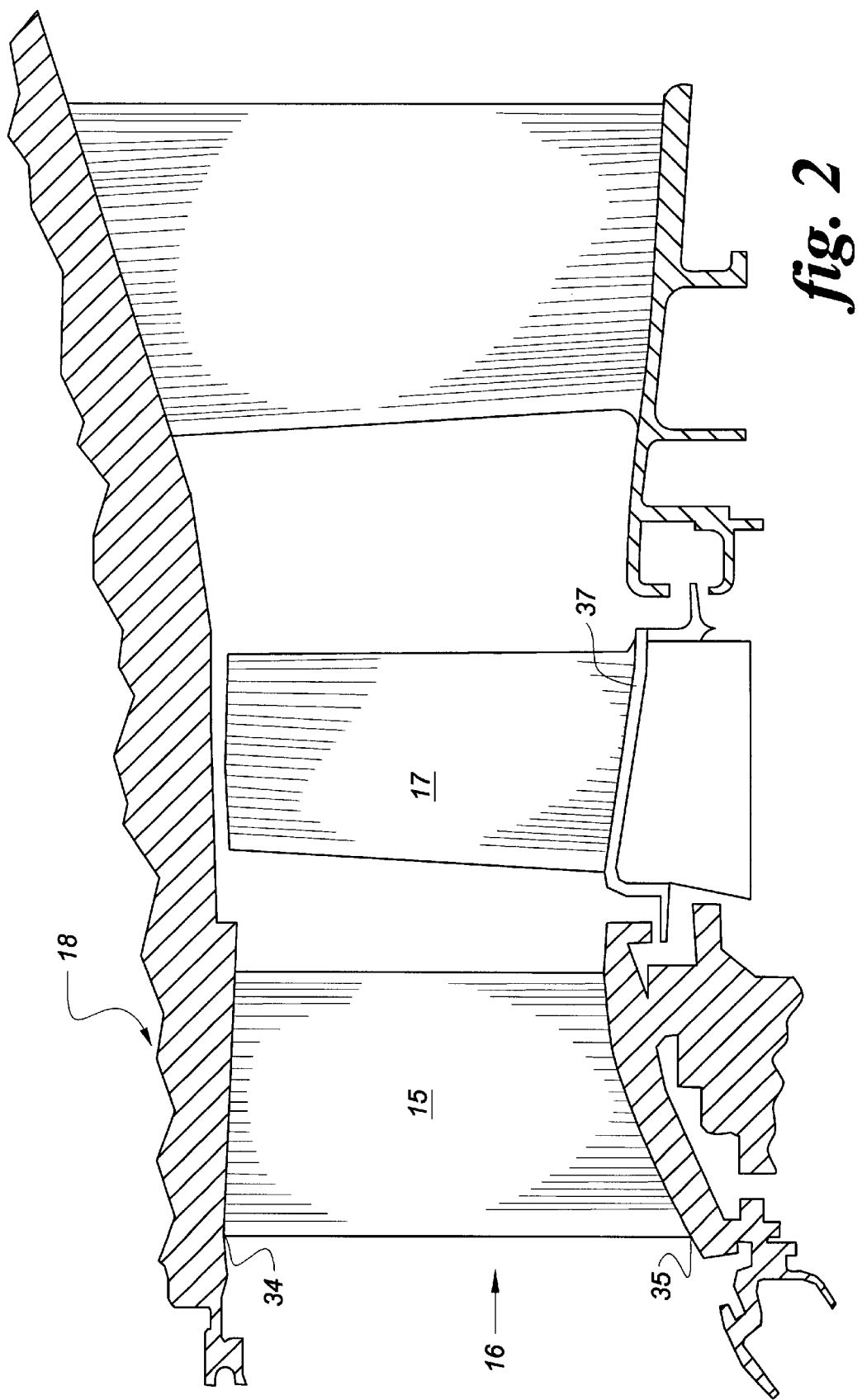
FIG. 2 is a side view showing a typical vane and blade airfoil.

FIG. 1 is a cross-sectional view of a gas turbine engine 10 of the type employing sets 18 of compressor and turbine airfoils according to the present invention. Gas turbine engine 10 includes a compressor 14, a combustor section 13 and a turbine 12. As is well known in the art, air compressed in compressor 14 is mixed with fuel which is burned in combustor section 13 and expanded in turbine 12. The air compressed in the compressor 14 and the fuel mixture expanded in turbine 12 can both be referred to as a hot gas stream flow 16. FIG. 2 shows a typical set 18 of airfoils, which set 18 of airfoils can be either rotating airfoils 17 called rotors or blades or stationary airfoils 15 called stators or vanes.

Figure 3:
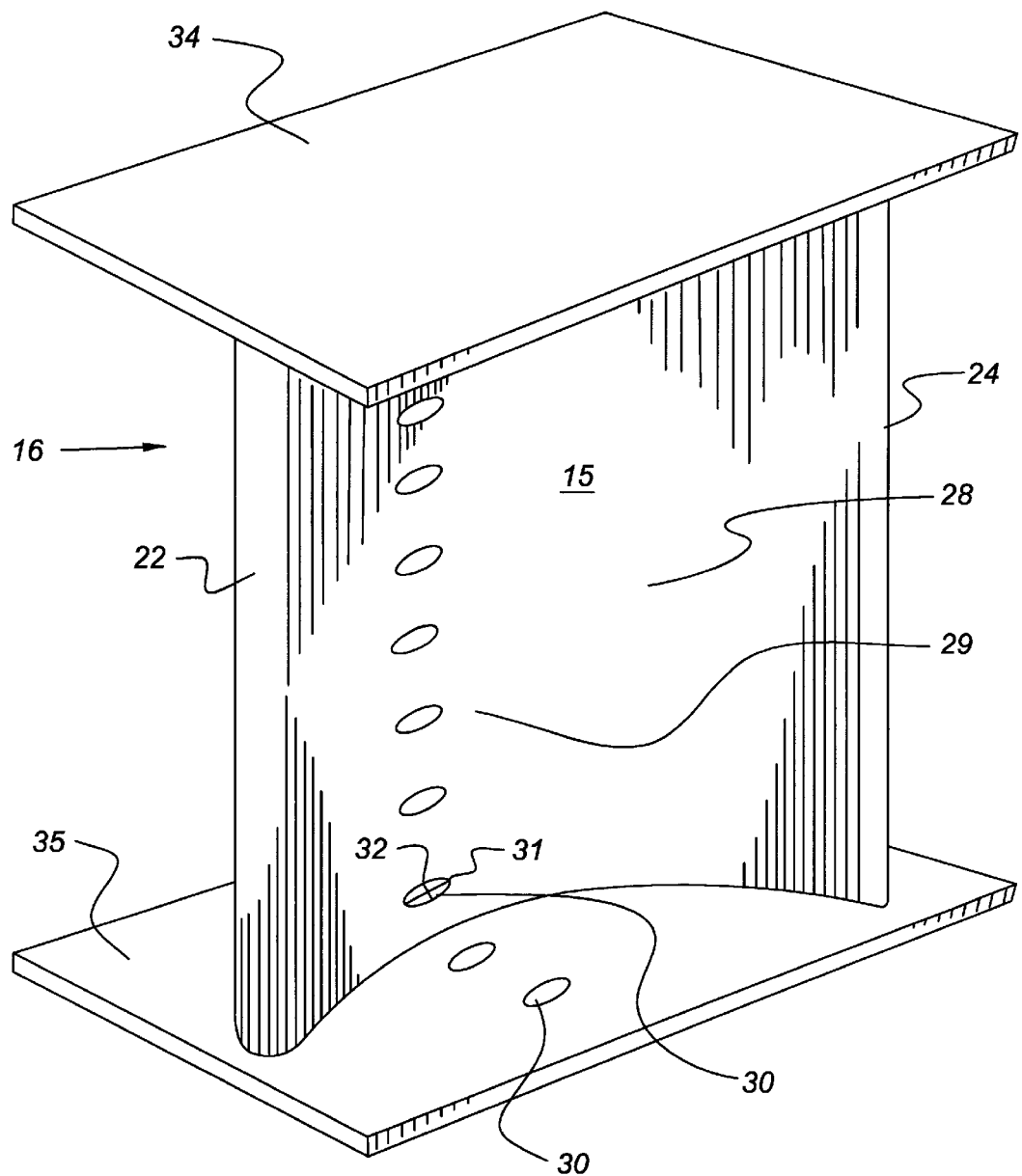
FIG. 3 is an enlarged perspective view of a vane airfoil in combination with two endwalls.
Figure 4:
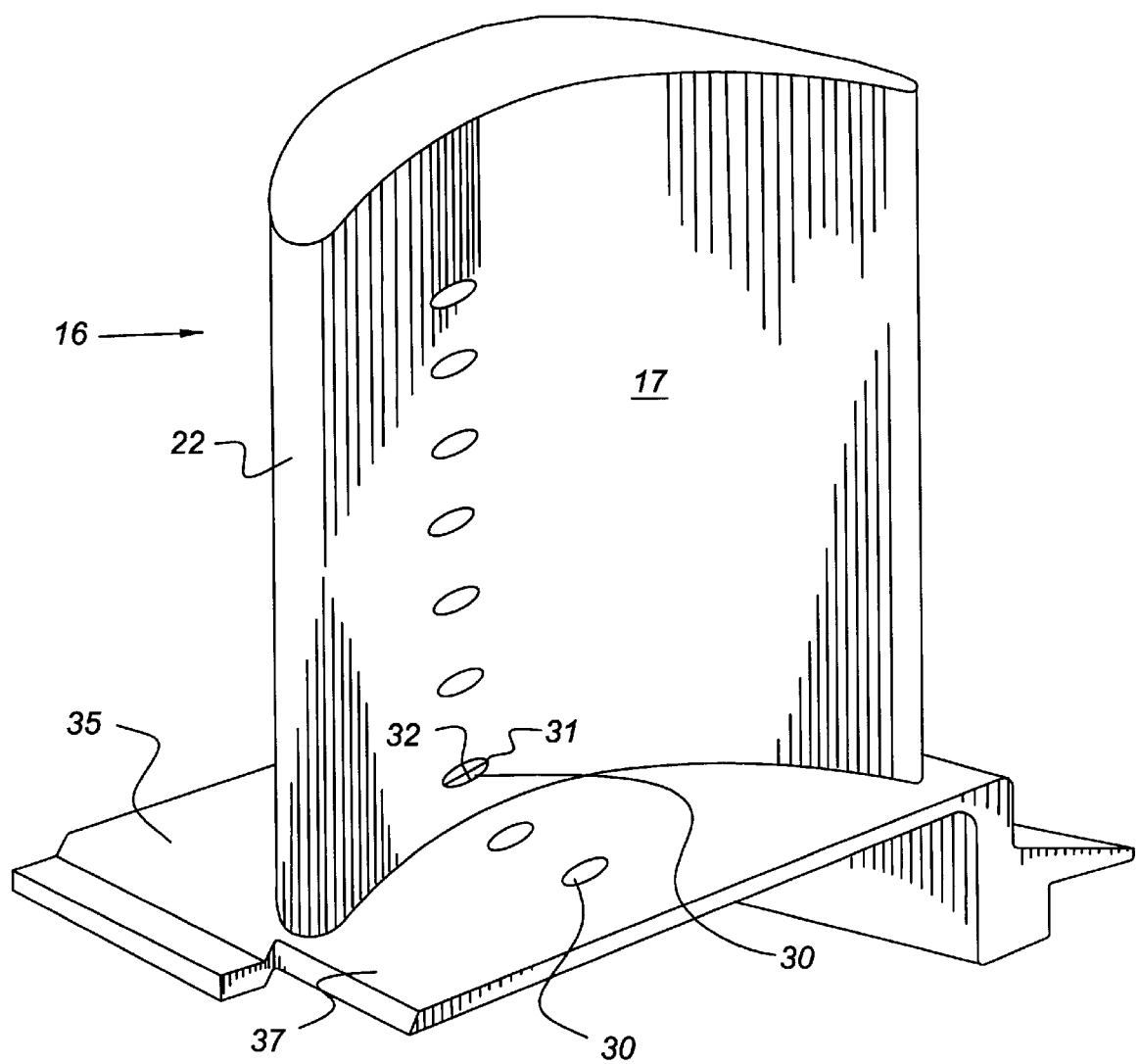
FIG. 4 is an enlarged perspective view of a blade airfoil in combination with an endwall.

FIG. 3 is an enlarged perspective view of a stator or vane airfoil 15 that is stationary with respect to hot gas stream flow 16. Stator airfoil 15 is bounded at each radial end by an endwall 34, 35. FIG. 4 is an enlarged perspective view of a rotor or blade airfoil 17 that rotates with respect to the hot gas stream flow 16. Because of the rotation, rotor airfoil 17 is bounded at only one radial end by an endwall 37.

Figure 5:
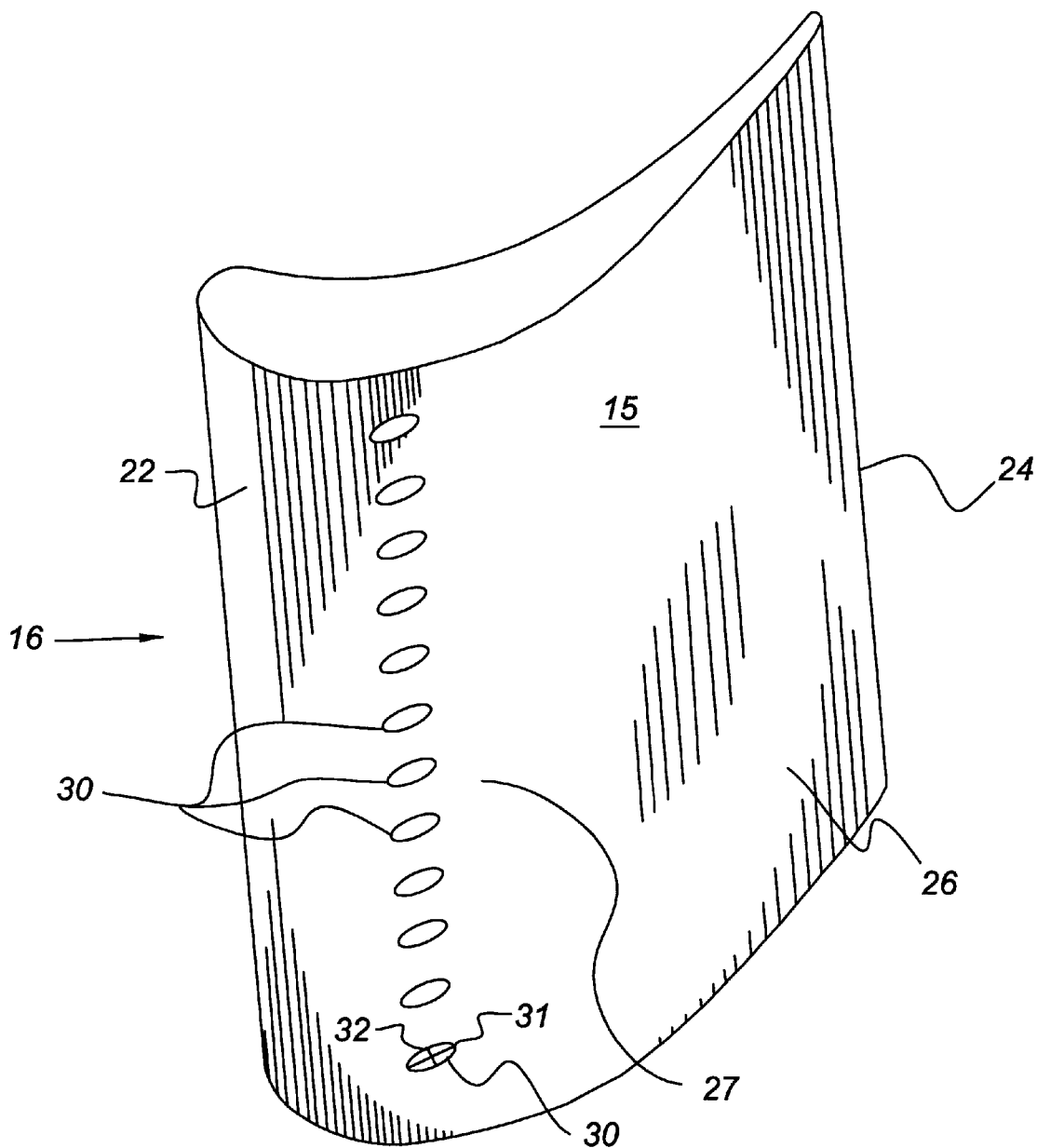
FIG. 5 is an enlarged perspective view of the suction area of the airfoil of FIG. 3.
Figure 6:
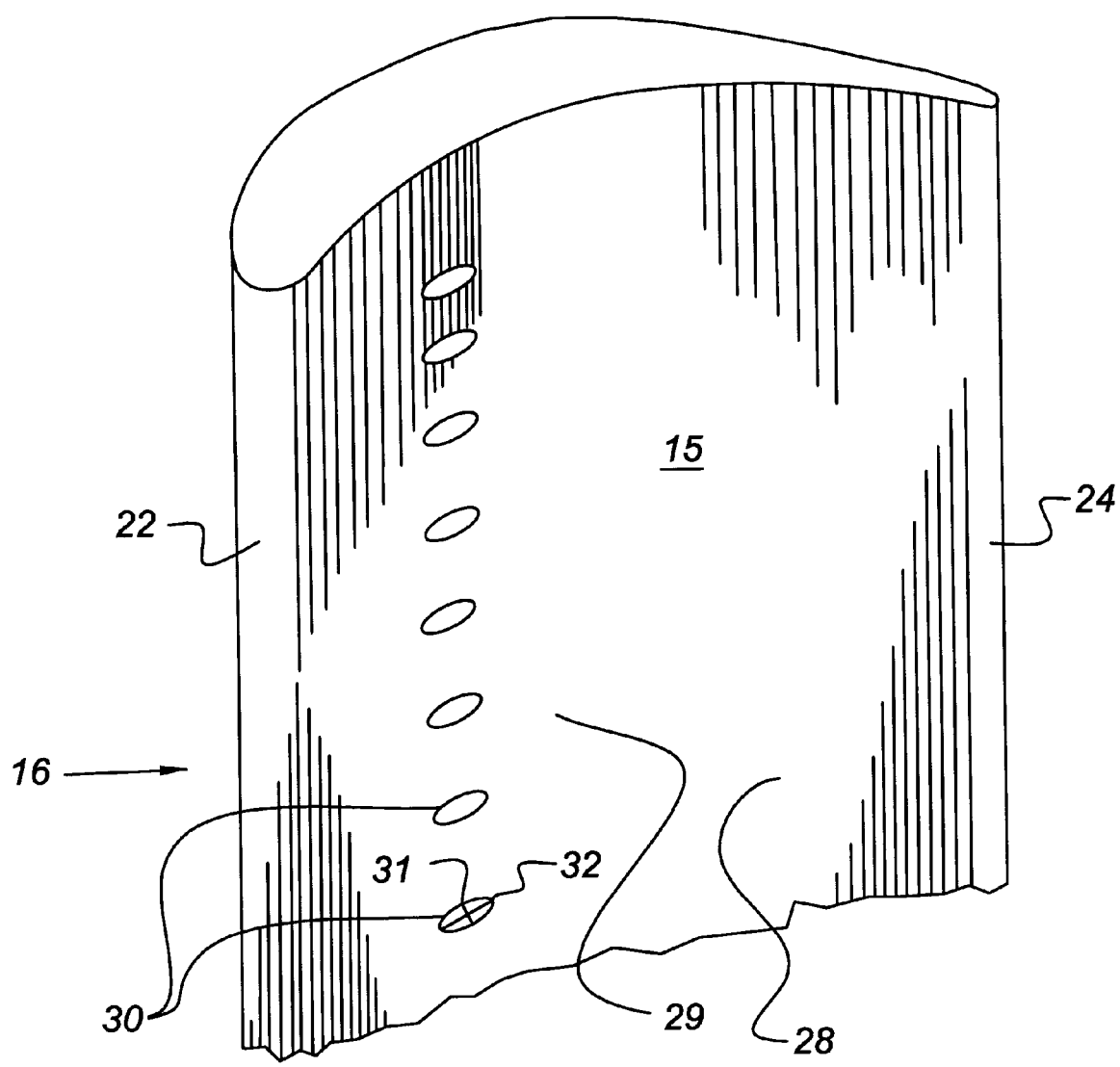
FIG. 6 is an enlarged perspective view of the pressure area of the airfoil of FIG. 3.

Stator airfoil 15 shown in FIG. 3 comprises a body having a leading edge 22 and a trailing edge 24. Airfoil 15 has an exterior surface shaped from leading edge 22 to trailing edge 24 so as to have a suction area 26 as is shown in FIG. 5. Suction area 26 is convex in shape and has a curved area 27 near leading edge 22. Suction area 26 typically experiences a relatively low gas pressure as hot gas stream flow 16 passes thereover. Airfoil 15 also has a pressure area 28 as shown in FIG. 6 that is concave in shape. Pressure area 28 has a curved area 29 near leading edge 22 and typically experiences a relatively high gas pressure as hot gas stream flow 16 passes thereover.

Figure 8A:
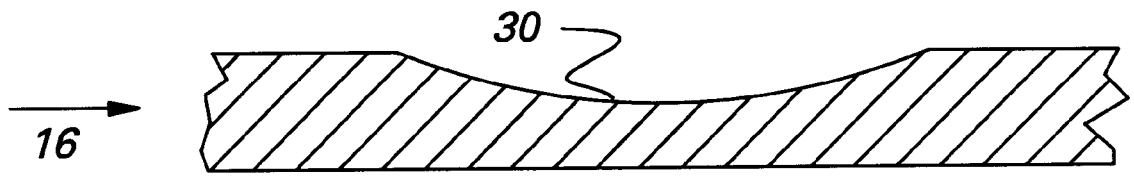
FIG. 8A is a cross-sectional view of an airfoil skin having a heat reducing dimple therein.
Figure 8B:
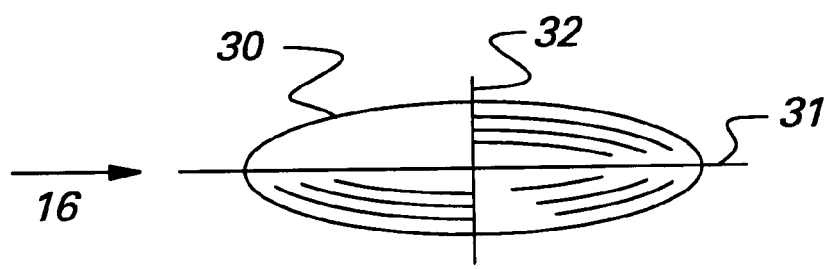
FIG. 8B is a top view of the heat reducing dimple in FIG. 8A.

Reduction of heat load on airfoil 15 is accomplished by the presence of at least one heat reducing dimple 30 on the surface of airfoil 15. A typical dimple 30 of the type used in this invention is shown in FIG. 8B. Dimple 30 typically has a "length" 31 that is aligned with the expected direction of hot gas stream flow 16 across airfoil 15 from leading edge 22 to trailing edge 24 as shown in FIG. 5. The "width" 32 of dimple 30 is typically transverse to the expected direction of hot gas stream flow 16 across airfoil 15. Length 31 of dimple 30 is typically at least equal to or greater than its width 32. If the width 32 were to be greater than the length 31, there would be an increase in the drag force that is known in the art to increase the heat transfer coefficients and heat load. Also, it is preferred that length 31 be not more than five times greater than width 32 in order for the invention to achieve desired results.

Dimple 30, as shown in FIG. 8B, is oval. However, dimple 30 could have other shapes so long as length 31 is at least equal to or greater than width 32. Also, dimple 30 could be of variable size and location on airfoil 15. If more than one heat reducing dimple 30 is used, the various heat reducing dimples 30 need not be symmetrical with others on the same airfoil 15 or set. Dimple 30 can be of variable size and is much larger in size than the riblets of the prior art. Dimple 30 typically has a length 31 of at least 0.1 inches and a width 32 of at least 0.02 inches. Also, it is contemplated that dimple 30 can be of variable depth and still be within the present invention. As such, there is no limit on the depth of dimple 30.

As noted above, dimples 30 can be located anywhere on an airfoil 15. For example, referring to FIGS. 3, 5, and 6, dimples 30 can be located on airfoil 15 on or near leading edge 22, suction area 26, pressure area 28, or on an associated endwall 34, 35. FIG. 5 shows a preferred a embodiment of the present invention in an enlarged perspective of suction area 26 of airfoil 15. It is believed that placement of a row of heat reducing dimples 30 on curved area 27 of suction area 26 can serve to reduce the downstream heat load by as much as twenty five percent. FIG. 6 shows a row of dimples 30 on pressure area 28 adjacent to leading edge 22 of the airfoil 15. As will be further explained below, heat reducing dimples 30 alter the flow pattern of hot gas stream flow 16 as hot gas stream flow 16 passes over airfoil 15 so as to reduce the heat transfer coefficient on airfoil 15 downstream of each dimple 30. This serves to reduce the total heat load on airfoil 15.

Since airfoil 15, as shown in FIGS. 3, 5, and 6, is a stator or a vane, airfoil 15 will be stationary with respect to hot gas stream flow 16 passing thereover. As such, the expected direction of hot gas stream flow 16 will be transverse to leading edge 22 and length 31 of dimple 30 is likewise essentially transverse to leading edge 22 so as to be aligned with the direction of hot gas stream flow 16. Referring to FIG. 4, since airfoil 17 is a rotor or blade, it will be rotating with respect to hot gas stream flow 16 passing thereover. Thus, the expected direction of hot gas stream flow 16 will be a relative flow direction, relative to the rotation of the airfoil 17. Accordingly, the optimum cooling effect will be achieved by aligning length 31 of each dimple 30 with the expected direction of hot gas stream flow 16 or relative flow direction so that, under normal operating conditions, length 31 will be aligned with the direction of hot gas stream flow 16. It is understood that it is generally straightforward to determine the direction of hot gas stream flow 16 or relative flow direction of airfoil 17.

It is well known in the art that for an airfoil of a turbine or a compressor, the hot gas stream flow may be laminar as it passes over the leading edge of the airfoil and will then undergo a Transition to turbulent flow at some point as it passes to the trailing edge. It is understood in the art that laminar flow is a streamlined flow in which all particles of the hot gas stream move in distinct, separate layers. The area of the airfoil over which the hot gas stream flow is laminar is referred to as the "laminar area". In turbulent flow, the particles of the hot gas stream move in patterns known as vortices and eddies. The area of the airfoil over which the hot gas stream flow is turbulent is referred to as the "turbulent area". In between the laminar area and the turbulent area will be an area over which the hot gas stream is in a transition from laminar to turbulent flow. This area is referred to as the "transition area". It is known that the heat load on the laminar area will be lower than the heat load on the transition area which will, in turn, be lower than the heat load on the turbulent area.

In accordance with the present invention, where there is a laminar area of an airfoil, placement of dimples 30 in that area will lower the heat load downstream of same. It is believed that the presence of a dimple serves to delay the transition of a hot gas stream flow from laminar to turbulent flow downstream and thus reduces the total heat load. Similarly, placement of a dimple over a transition area will serve to reduce the total heat load on the airfoil downstream of its location. It is believed the dimple delays the transition of the hot gas stream flow from transitional to totally turbulent flow. Finally, placement of a dimple 30 on a turbulent area of an airfoil 15 will likewise reduce the heat load downstream on an airfoil apparently because the dimple will interact with the eddies of the hot gas stream flow over the turbulent area in such a way that the eddies present less disturbance of and interaction with a boundary layer on the airfoil and reduce turbulent bursts.

It is understood that an associated endwall of an airfoil may also have a laminar area, a transition area, and a turbulent area. Placement of dimple 30 on these areas of the endwall will have similar effect to placement on the airfoil.

Figure 7:
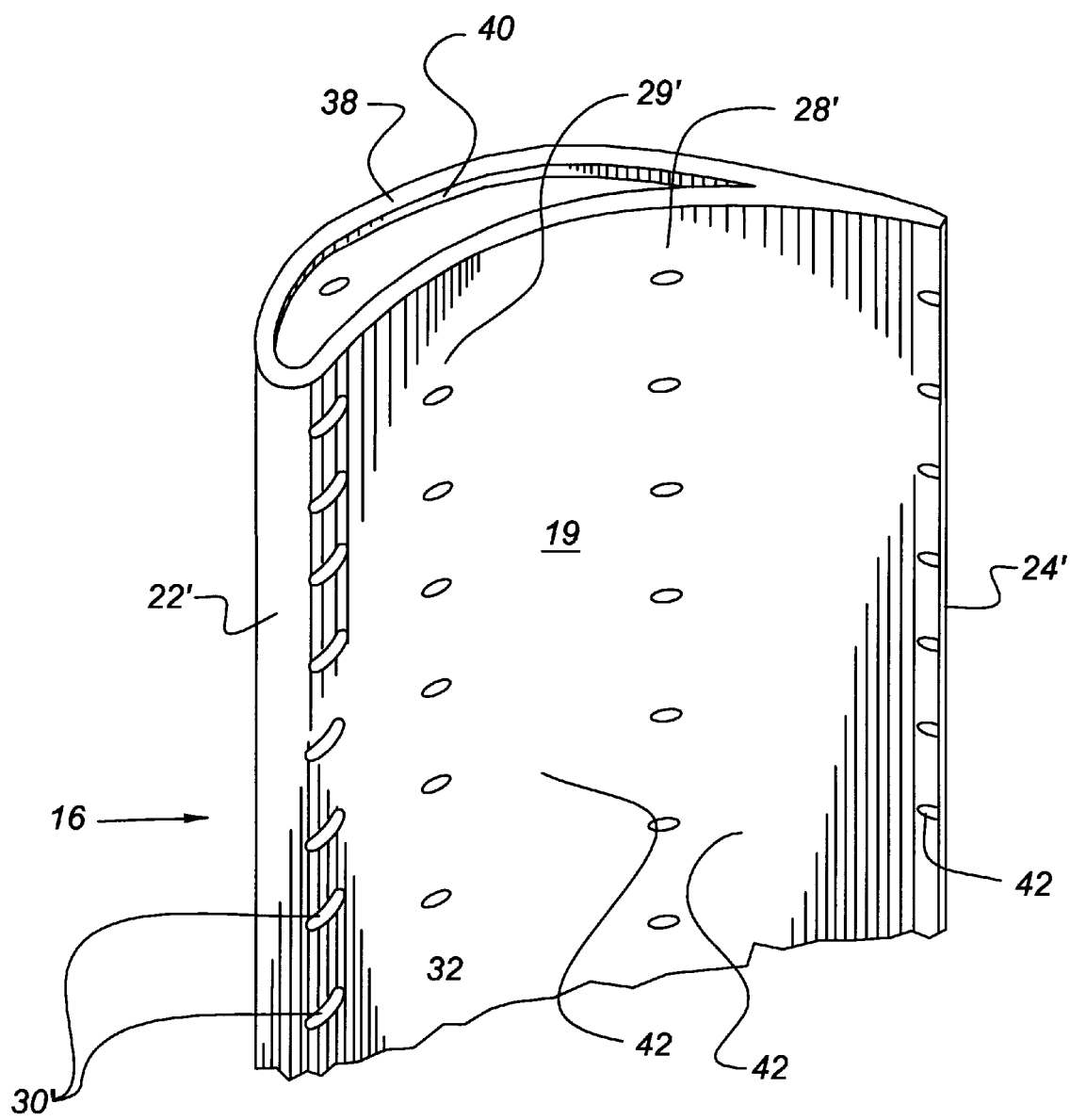
FIG. 7 is an enlarged perspective view of the pressure area of a film cooled airfoil employing the present invention.

The present invention is useful with an airfoil made of solid metal or one that has an interior 40 which is hollow, as shown in FIG. 7. If airfoil 15, 17 is solid, then dimple 30 will simply be an indentation in the surface of airfoil 15, 17 as shown in FIGS. 8A and 8B. Referring again to FIG. 7, if airfoil 19 has an interior 40, interior 40 will be covered by a skin 38. The skin 38 will be the total thickness of the airfoil, from interior 40 to the exterior surface of airfoil 19. Although it is preferred that dimples 30 not penetrate skin 38, the benefits of the invention can still be obtained even if they do. It is understood that an associated endwall of the airfoil may be made of solid metal or be hollow with an interior 40 and skin 38. It is also preferred that dimple 30 not penetrate skin 38 of an endwall, but the benefits will still be obtained even if dimple 30 does penetrate.

It is contemplated that the present invention could be employed in an existing airfoil 19 (see FIG. 7) which already employs film cooling using film cooling holes 42. Airfoil 19 will have an endwall (not shown) which also has a series of film cooling holes. However, if dimples 30 penetrate skin 38 to interior 40, then interior 40 must have a "dead space" in communication with dimple 30. In other words, there must be a baffle 44 within the airfoil to close off a section 46 of interior 40 in communication with dimple 30 so that dimple 30 does not come in contact with the cooling fluid. If dimple 30 did come in contact with a cooling fluid, that would merely be the film cooling mechanism of the prior art. As such, dimple 30 will be in communication with section 46 which is closed off from cooling fluid in interior 40 by baffle 44. Given that dimple 30 is quite large and hence would be easy to machine without the need for sophisticated machining such as electrochemical machining, the present invention could be easily incorporated in an existing airfoil 19 or endwall. The use of the invention in this way would save energy and power since less film cooling would be necessary to accomplish the similar results in reduction of heat load.

It is known in the art to apply thermal barrier coatings to the exterior of an airfoil. If an airfoil were to have a thermal barrier coating, dimples could be formed in the thermal barrier coating to provide the benefits of the present invention, provided the thermal barrier coating has sufficient thickness.

Those skilled in the art will appreciate that while some of the preferred and alternate embodiments of the present invention have been described fully to explain its principles, it is understood that various modifications may be made without departing from the scope of the invention. Accordingly, the following claims encompass all such modifications without departing from the scope of the invention.

What is claimed is:

1. An airfoil with a reduced heat load for use in either a turbine or a compressor through which a hot gas stream flow passes, said airfoil comprising a body having a leading edge and a trailing edge and said body having an exterior surface shaped from the leading edge to the trailing edge so as to have a suction area which will experience relatively low gas pressure as a hot gas stream flow passes thereover from the leading edge to the trailing edge and a pressure area which will experience a relatively high gas pressure as a hot gas stream flow passes thereover from the leading edge to the trailing edge, said body having at least one heat reducing dimple whose length in the expected direction of hot gas stream flow is at least equal to or greater than its width transverse to such direction wherein said at least one heat reducing dimple is located on said suction area adjacent to said leading edge of said airfoil and said suction area has a curved area and said at least one heat reducing dimple is located on said curved area.

2. The airfoil of claim 1 wherein said at least one heat reducing dimple is located on said pressure area adjacent to said leading edge of said airfoil.

3. The airfoil of claim 1 wherein a row of heat reducing dimples are formed adjacent to said leading edge of said airfoil.

4. The airfoil of claim 1 in combination with an endwall, said endwall having at least one heat reducing dimple whose length in the expected direction of hot gas stream flow is at least equal to or greater than its width transverse to such direction.

5. The airfoil of claim 4 wherein at least one of said airfoil and said endwall has a laminar area over which said hot gas stream flow is laminar and said at least one heat reducing dimple is located on said laminar area so as to delay a transition of said hot gas stream flow from laminar flow to a turbulent flow downstream of said at least one heat reducing dimple.

6. The airfoil of claim 4 wherein at least one of said airfoil and said endwall has a transition area wherein said hot gas stream flow is in transition from laminar to turbulent flow and said at least one heat reducing dimple is located on said transition area so as to delay said hot gas stream flow from becoming a turbulent flow downstream of said at least one heat reducing dimple.

7. The airfoil of claim 4 wherein at least one of said airfoil and said endwall has a turbulent area over which said hot gas stream flow is turbulent with eddies and said at least one heat reducing dimple is located on said turbulent area.

8. The airfoil of claim 4 wherein at least one of said airfoil and said endwall has a skin and said at least one heat reducing dimple penetrates said skin and contacts an interior of said at least one of said airfoil and said endwall.

9. The airfoil of claim 4 wherein at least one of said airfoil and said endwall has a series of film holes which penetrate a skin of said at least one of said airfoil and said endwall and contact an interior of said at least one of said airfoil and said endwall so as to be in communication with a cooling fluid flowing through said interior.

10. The airfoil of claim 1 wherein said airfoil is stationary with respect to said hot gas stream flow and said length of said at least one heat reducing dimple in said expected direction of hot gas stream flow is substantially transverse to said leading edge.

11. The airfoil of claim 1 wherein said airfoil is rotating with respect to said hot gas stream flow, said expected direction of hot gas stream flow is relative to said airfoil.

12. A method of reducing heat load on an airfoil for use in either a turbine or a compressor through which a hot gas stream flow passes comprising the steps of:

providing said airfoil with a body having a leading edge and a trailing edge, said body having a suction area which will experience a relatively low pressure as a hot gas stream flow passes thereover from the leading edge to the trailing edge and a pressure area which will experience a relatively high pressure as a hot gas stream flow passes thereover from the leading edge to the trailing edge; and forming at least one heat reducing dimple in said body, the length of said at least one heat reducing dimple in the expected direction of hot gas stream flow being at least equal to or greater than its width transverse to such direction, wherein said at least one heat reducing dimple is located on said suction area adjacent to said leading edge of said airfoil, wherein said suction area has a curved area and said at least one heat reducing dimple is formed in said curved area.

13. The method of claim 12 wherein said at least one heat reducing dimple is located on said pressure area adjacent to said leading edge of said airfoil.

14. The method of claim 12 further comprising the step of forming a row of heat reducing dimples adjacent to said leading edge of said airfoil.

15. The method of claim 12 where said airfoil is in combination with an endwall, said method further comprising the step of forming at least one heat reducing dimple on said endwall wherein the length of said at least one heat reducing dimple in the expected direction of hot gas stream flow is at least equal to or greater than its width transverse to such direction.

16. The method of claim 15 wherein at least one of said airfoil and said endwall has a laminar area over which said hot gas stream flow is laminar, said method further comprising the step of delaying a transition from laminar flow to turbulent flow on said at least one of said airfoil and said endwall by forming said at least one heat reducing dimple in said laminar area.

17. The method of claim 15 wherein at least one of said airfoil and said endwall has a transition area wherein said hot gas stream flow is in transition from laminar to turbulent flow, said method further comprising the step of delaying said hot gas stream flow from becoming a turbulent flow by forming at least one heat reducing dimple in said transition area.

18. The method of claim 15 wherein at least one of said airfoil and said endwall has a turbulent area over which a hot gas stream flow is turbulent having a number of eddies, said method further comprising the step of forming said at least one heat reducing dimple in said turbulent area.

19. The method of claim 12 wherein said airfoil is stationary with respect to said hot gas stream flow and said length of said at least one heat reducing dimple in said expected direction of hot gas stream flow is substantially transverse to said leading edge.

20. The method of claim 12 wherein said airfoil is rotating with respect to said hot gas stream flow, said expected direction of hot gas stream flow is relative to said airfoil.

\* \* \* \* \*